United States Patent
Gelardi et al.

(10) Patent No.: US 12,314,362 B2
(45) Date of Patent: May 27, 2025

(54) USER AUTHENTICATION BASED ON BEHAVIORAL BIOMETRICS

(71) Applicant: British Telecommunications public limited company, London (GB)

(72) Inventors: Gabriele Gelardi, London (GB); Ali Sajjad, London (GB); Gery Ducatel, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 264 days.

(21) Appl. No.: 17/597,629

(22) PCT Filed: Jun. 16, 2020

(86) PCT No.: PCT/EP2020/066598
§ 371 (c)(1),
(2) Date: Jan. 14, 2022

(87) PCT Pub. No.: WO2021/008797
PCT Pub. Date: Jan. 21, 2021

(65) Prior Publication Data
US 2022/0261466 A1  Aug. 18, 2022

(30) Foreign Application Priority Data

Jul. 16, 2019 (EP) ..................... 19186557
Jul. 16, 2019 (GB) ..................... 1910169

(51) Int. Cl.
*G06F 21/32* (2013.01)
*G06F 21/31* (2013.01)

(52) U.S. Cl.
CPC ............ *G06F 21/32* (2013.01); *G06F 21/316* (2013.01)

(58) Field of Classification Search
CPC ..... G06F 21/32; G06F 21/316; H04L 9/3231; H04L 63/0861; H04L 9/085;
(Continued)

(56) References Cited

U.S. PATENT DOCUMENTS 8,131,763 B2  3/2012  Tuscano et al.
8,909,297 B2  12/2014  Matas et al.
(Continued)

FOREIGN PATENT DOCUMENTS

AU  2018100672 A4  6/2018
CN  105678125 B  2/2019
(Continued)

OTHER PUBLICATIONS

Aldosary S., et al., "A Robust Multimodal Biometric Security System using the Polynomial Curve Technique within Shamir's Secret Sharing Algorithm," Emerging Security Technologies (EST), 2012, sections 1, 2, 2.1, pp. 66-69.
(Continued)

*Primary Examiner* — Dustin Nguyen
(74) *Attorney, Agent, or Firm* — EIP US LLP

(57) ABSTRACT

Computer implemented methods for enrolling a user as an authenticated user of a computing device and for authenticating a user of a computing device are provided. The methods make use of behavioral biometrics to determine a set of shares that represent a secret credential according to a secret sharing scheme. The set of shares is initially determined when the user is enrolled based on typical measurements of the user's behavioral biometrics and authentication data indicating how to generate the set of shares from a user's behavioral biometrics is generated. When authenticating the user, the computing device can generate the set of shares based on the authentication data and measurements of the current user's behavioral biomet-
(Continued)

rics. The computing device can use the generated set of shares to recreate a copy of the secret credential with which to authenticate the user.

16 Claims, 4 Drawing Sheets

(58) Field of Classification Search
CPC ... H04L 9/0869; H04L 9/3263; H04L 9/3278; H04W 12/68; H04W 12/068; G06K 7/10475; G06Q 20/306
See application file for complete search history.

(56) References Cited

U.S. PATENT DOCUMENTS

| | | | |
|---|---|---|---|
| 9,684,775 B2 | 6/2017 | Gupta et al. | |
| 9,788,203 B2 | 10/2017 | Dutt et al. | |
| 9,817,957 B1* | 11/2017 | Molina-Markham | G06F 21/602 |
| 9,935,947 B1* | 4/2018 | Machani | H04L 63/0861 |
| 10,055,566 B2 | 8/2018 | Kwok-Suzuki et al. | |
| 10,057,227 B1 | 8/2018 | Hess et al. | |
| 10,063,562 B1 | 8/2018 | Molina-Markham et al. | |
| 10,104,073 B2 | 10/2018 | Novack et al. | |
| 10,140,441 B2 | 11/2018 | Cheng et al. | |
| 10,142,308 B1* | 11/2018 | Duchin | H04L 63/08 |
| 10,146,922 B2 | 12/2018 | Guidotti et al. | |
| 10,652,238 B1* | 5/2020 | Edwards | H04L 63/102 |
| 10,693,661 B1* | 6/2020 | Hamlet | G06F 21/31 |
| 10,778,677 B1* | 9/2020 | Griffin | H04L 63/0861 |
| 11,115,196 B1* | 9/2021 | Triandopoulos | H04L 63/083 |
| 2002/0162031 A1 | 10/2002 | Levin et al. | |
| 2002/0186838 A1* | 12/2002 | Brandys | H04L 9/3263 713/185 |
| 2010/0115610 A1* | 5/2010 | Tredoux | G06F 21/316 726/19 |
| 2011/0191837 A1* | 8/2011 | Guajardo Merchan | H04L 9/3278 726/6 |
| 2012/0137340 A1 | 5/2012 | Jakobsson et al. | |
| 2012/0204035 A1* | 8/2012 | Camenisch | G06F 21/32 713/186 |
| 2013/0097416 A1 | 4/2013 | Barra et al. | |
| 2013/0133055 A1 | 5/2013 | Ali et al. | |
| 2014/0053261 A1 | 2/2014 | Gupta et al. | |
| 2014/0289833 A1 | 9/2014 | Briceno et al. | |
| 2014/0300554 A1* | 10/2014 | Samuel | H04W 12/068 345/173 |
| 2015/0113631 A1 | 4/2015 | Lerner et al. | |
| 2015/0169858 A1 | 6/2015 | Tg | |
| 2015/0178496 A1 | 6/2015 | Kohlenberg et al. | |
| 2015/0371023 A1 | 12/2015 | Chen et al. | |
| 2015/0373051 A1 | 12/2015 | Dayan et al. | |
| 2015/0379253 A1* | 12/2015 | Cook | G06F 21/32 726/19 |
| 2016/0110528 A1 | 4/2016 | Gupta et al. | |
| 2016/0180068 A1 | 6/2016 | Das et al. | |
| 2016/0239649 A1 | 8/2016 | Zhao | |
| 2016/0300049 A1 | 10/2016 | Guedalia et al. | |
| 2016/0366126 A1 | 12/2016 | Sharifi et al. | |
| 2017/0006009 A1* | 1/2017 | Hessler | G06F 21/316 |
| 2017/0024660 A1 | 1/2017 | Chen et al. | |
| 2017/0032113 A1 | 2/2017 | Tunnell et al. | |
| 2017/0109514 A1 | 4/2017 | Cheng et al. | |
| 2017/0177999 A1 | 6/2017 | Novik et al. | |
| 2017/0227995 A1 | 8/2017 | Lee et al. | |
| 2017/0293748 A1 | 10/2017 | Kurupati | |
| 2017/0364673 A1 | 12/2017 | Gupta et al. | |
| 2018/0012003 A1 | 1/2018 | Asulin et al. | |
| 2018/0032709 A1 | 2/2018 | Martin Perez et al. | |
| 2018/0068098 A1 | 3/2018 | Finzi et al. | |
| 2018/0069867 A1 | 3/2018 | Grajek et al. | |
| 2018/0077154 A1 | 3/2018 | Smith et al. | |
| 2018/0097806 A1 | 4/2018 | Blinn | |
| 2018/0107833 A1 | 4/2018 | Gadepalli et al. | |
| 2018/0181741 A1 | 6/2018 | Whaley | |
| 2018/0232504 A1 | 8/2018 | Bradley et al. | |
| 2018/0293367 A1 | 10/2018 | Urman | |
| 2018/0375859 A1* | 12/2018 | Huh | H04L 9/0869 |
| 2019/0005408 A1 | 1/2019 | Tolpin et al. | |
| 2019/0034917 A1* | 1/2019 | Nolan | G06K 7/10475 |
| 2019/0140833 A1 | 5/2019 | Grajek et al. | |
| 2019/0236249 A1 | 8/2019 | Pavlou et al. | |
| 2019/0364027 A1 | 11/2019 | Pande et al. | |
| 2019/0386972 A1* | 12/2019 | Boutnaru | G06Q 20/306 |
| 2020/0125706 A1 | 4/2020 | Adir et al. | |
| 2020/0242232 A1* | 7/2020 | Machani | H04L 63/0884 |
| 2020/0412528 A1* | 12/2020 | Saint | H04W 12/068 |
| 2021/0076212 A1 | 3/2021 | Manikantan Shila et al. | |
| 2021/0174813 A1 | 6/2021 | Huh et al. | |
| 2021/0397683 A1 | 12/2021 | Liem et al. | |
| 2022/0012672 A1* | 1/2022 | Inman | G06F 21/32 |
| 2022/0100829 A1 | 3/2022 | Gelardi et al. | |
| 2022/0164422 A1 | 5/2022 | Gelardi et al. | |

FOREIGN PATENT DOCUMENTS

| | | | |
|---|---|---|---|
| WO | WO-2012085047 A1 | 6/2012 | |
| WO | 2013096944 A1 | 6/2013 | |
| WO | WO-2014179076 A1 | 11/2014 | |
| WO | WO-2014205148 A1 | 12/2014 | |
| WO | 2018025019 A1 | 2/2018 | |
| WO | 2018048427 A1 | 3/2018 | |

OTHER PUBLICATIONS

Antal M et al., "Identity Information Revealed From Mobile Touch Gestures," Studia Universitatis Babes-Bolyai, Informatica, May 21-25, 2014, vol. LIX, 11 pages.

Blakley G.R., "Safeguarding Cryptographic Keys", National Computer Conference 1979, pp. 313-317.

Bo C., et al., "SilentSense: Silent User Identification via Dynamics of Touch and Movement Behavioural Biometrics," in MobiCom, arXiv:1309.0073v1 [cs.CR], Aug. 31, 2013, 9 pages.

Buduru A.B., et al., "An Effective Approach to Continuous User Authentication for Touch Screen Smart Devices," 2015 IEEE International Conference on Software Quality, Reliability and Security (QRS), Vancouver, BC, 2015, pp. 219-226.

Combined Search and Examination Report under Sections 17 and 18(3) for Great Britain Application No. 1910169.0, mailed on Feb. 25, 2020, 10 pages.

Crawford H.A., "A Framework for Continuous, Transparent Authentication on Mobile Devices," PhD thesis, University of Glasgow, 2012, 209 pages.

Crouse D., et al., "Continuous Authentication of Mobile User: Fusion of Face Image and Inertial Measurement Unit Data," 2015 International Conference on Biometrics (ICB), Phuket, 2015, pp. 135-142.

Damgard I., et al., "Multiparty Computation from Somewhat Homomorphic Encryption," Advances in Cryptology—CRYPTO 2012, Proceedings of the 32nd Annual Cryptology Conference, Santa Barbara, CA, USA, Aug. 19-23, 2012, pp. 643-662.

Deutschmann I., et al al., "Continuous Authentication Using Behavioral Biometrics," Security DARPA, ITPro, Jul./Aug. 2013, pp. 12-15.

Examination Report under section 18(3) for GB Application No. 1910169.0, mailed on Aug. 13, 2021, 4 pages.

Extended European Search Report for Application No. 19186557.5 mailed on Nov. 7, 2019, 6 pages.

Fathy M.E., et al., "Face-Based Active Authentication on Mobile Devices," 2015 IEEE International Conference on Acoustics, Speech and Signal Processing (ICASSP), South Brisbane, QLD, 2015, pp. 1687-1691.

Feng T., et al., "Continuous Mobile Authentication using Touchscreen Gestures," Homeland Security (HST), 2012 IEEE Conference on Technologies for Homeland Security, Waltham MA, 2012, pp. 451-456.

(56) References Cited

OTHER PUBLICATIONS

Frank M., et al., "Touchalytics: On the Applicability of Touchscreen Input as a Behavioral Biometric for Continuous Authentication," Jan. 2013, IEEE Transactions on Information Forensics and Security, vol. 8, No. 1, XP011484631, ISSN: 1556-6013, DOI:10.1109/TIFS.2012.2225048, 13 pages.
Gong N.Z., et al., "Forgery-Resistant Touch-based Authentication on Mobile Devices," 11 ACM on Asia Conference on Computer and Communications Security, May 30-Jun. 3, 2016, 12 pages.
Howells G., "Security and Privacy for the Internet of Things (SPIRIT)", EPSRC Research Grant Details, Jan. 1, 2017, 2 pages.
International Search Report and Written Opinion for Application No. PCT/EP2020/066598, mailed on Aug. 28, 2020, 11 pages.
Lee W.H et al., "Implicit Smartphone User Authentication with Sensors and Contextual Machine Learning," Princeton University, arXiv:1708.09754v1 [cs.CR], Aug. 30, 2017, 13 pages.
Li Y., et al., "Understanding OSN-Based Facial Disclosure Against Face Authentication Systems," Asia CCS'14, Jun. 4-6, 2014, pp. 413-423.
Li Y., et al., "Using Data Augmentation in Continuous Authentication on Smartphones," Feb. 2019, IEEE Internet of Things Journal, doi: 10.1109/JIOT.2018.2851185, vol. 6, No. 1, pp. 628-640.
Mondal S., et al., "Swipe Gesture based Continuous Authentication for Mobile Devices," 2015 International Conference on Biometrics (ICB), Jun. 2015, pp. 458-465. (9 pages).
Ometov A., et al., "Multi-factor Authentication: A Survey and Challenges in V2X Applications," 9th International Congress on Ultra Modern Telecommunications and Control Systems and Workshops, (sections I, III-B, III-C, III-D, figure 1.), Nov. 6, 2017, pp. 129-136.
Rathgeb C., et al., "A Survey on Biometric Cryptosystems and Cancelable Biometrics," EURASIP Journal on Information Security, vol. 2011, No. 1, Jan. 1, 2011, 25 pages.
Roy A., et al., "An HMM-based Multi-sensor Approach for Continuous Mobile Authentication," Military Communications Conference, MILCOM 2015, Track 3—Cyber Security and Trusted Computing, Tampa, FL, 2015, pp. 1311-1316.
Saevanee H., et al., "Continuous User Authentication using Multimodal Biometrics," Computers and Security, vol. 53, Issue C, Sep. 2015, 20 pages.
Samangouei P., et al., "Attribute-based Continuous User Authentication on Mobile Devices," 2015 IEEE 7th International Conference on Biometrics Theory, Applications and Systems (BTAS), Arlington, VA, 2015, 8 pages.
Serwadda A., et al., "When Kids' Toys Breach Mobile Phone Security," 2013 ACM SIGSAC Conference on Computer and Communications Security (CCS), Nov. 4-8, 2013, pp. 559-610.
Serwadda A., et al., "Which Verifiers Work?: A Benchmark Evaluation of Touch-based Authentication Algorithms," IEEE Sixth International Conference on Biometrics: Theory, Applications and Systems (BTAS), ser. BTAS'13, Sep. 2013, 8 pages.
Shamir A., "How to Share a Secret," Communications of the ACM, Nov. 1979, vol. 22, No. 11, pp. 612-613.
Shi W., et al., "SenGuard: Passive User Identification on Smartphones Using Multiple Sensors," 2011 IEEE 7th International Conference on Wireless and Mobile Computing, Networking and Communications (WiMob), Oct. 2011, pp. 141-148 (9pages).
Velten M., et al., "User Identity Verification Based on Touchscreen Interaction Analysis in Web Contexts," 11th International Conference on Information Security Practice and Experience, 2015, pp. 268-282.
Wu J S., et al., "Smartphone Continuous Authentication based on Keystroke and Gesture Profiling," The 49th Annual IEEE International Carnahan Conference on Security Technology, Sep. 21-24, 2015, pp. 191-197.
Xu H., et al., "Towards Continuous and Passive Authentication via Touch Biometrics: An Experimental Study on Smartphones," Tenth Symposium On Usable Privacy and Security, Jul. 9-11, 2014, pp. 187-198.

Yampolskiy R., et al., "Behavioural Biometrics: a Survey and Classification," International Journal of Biometrics, vol. 1, No. 1, 2008, pp. 81-113 (34 pages).
Zhang H., et al., "Robust Multimodal Recognition via Multitask Multivariate Low-Rank Representations," IEEE International Conference on Automatic Face and Gesture Recognition, 2015, 8 pages.
Zhang H., et al., "Touch Gesture-Based Active User Authentication Using Dictionaries," 2015 IEEE Winter Conference on Applications of Computer Vision, Waikoloa, HI, 2015, pp. 207-214.
"Combined Search and Examination Report under Sections 17 and 18(3) for Great Britain Application No. 1903029.5, mailed Sep. 5, 2019", 6 pages.
"Combined Search and Examination Report under Sections 17 and 18(3) for Great Britain Application No. 1903030.3, mailed on Aug. 28, 2019", 6 pages.
"Combined Search and Examination Report under Sections 17 and 18(3) for Great Britain Application No. 1903031.1, mailed on Sep. 9, 2019", 12 pages.
"Combined Search and Examination Report under Sections 17 and 18(3) for Great Britain Application No. 1903032.9, mailed on Sep. 3, 2019", 6 pages.
"Combined Search and Examination Report under Sections 17 and 18(3) for Great Britain Application No. 2019297.7, mailed on Sep. 1, 2021", 11 pages.
"Combined Search and Examination Report under Sections 17 and 18(3) for Great Britain Application No. GB1903033.7, mailed on Sep. 9, 2019", 9 pages.
"Combined Search and Examination Report under Sections 17 and 18(3) for Great Britain Application No. GB1911314.1 mailed on Nov. 27, 2019", 7 pages.
"Examination Report under Section 18(3) for Great Britain Application No. GB1911314.1, mailed on Jan. 25, 2022", 3 pages.
"Extended European Search Report for Application No. 19161162.3, mailed on Jun. 24, 2019", 7 pages.
"Extended European Search Report for Application No. 19161164.9, mailed on Jun. 26, 2019", 9 pages.
"Extended European Search Report for Application No. 19161165.6, mailed on Jun. 27, 2019", 7 pages.
"Extended European Search Report for Application No. 19161166.4, mailed on Jun. 27, 2019", 9 pages.
"Extended European Search Report for Application No. 19190589.2, mailed on Dec. 12, 2019", 9 pages.
"Extended European Search Report received for European Patent Application No. 19161163.1 mailed on Jun. 24, 2019", 7 pages.
"International Preliminary Report on Patentability for Application No. PCT/EP2020/055367, mailed on Sep. 16, 2021", 10 pages.
"International Preliminary Report on Patentability for Application No. PCT/EP2020/055369, mailed on Sep. 16, 2021", 8 pages.
"International Preliminary Report on Patentability for Application No. PCT/EP2020/055370, mailed on Sep. 16, 2021", 11 pages.
"International Preliminary Report on Patentability for Application No. PCT/EP2020/055371, mailed on Sep. 16, 2021", 11 pages.
"International Preliminary Report on Patentability for Application No. PCT/EP2020/055372, mailed on Sep. 16, 2021", 10 pages.
"International Preliminary Report on Patentability for Application No. PCT/EP2020/066598 mailed Jan. 27, 2022", 8 pages.
"International Preliminary Report on Patentability for Application No. PCT/EP2021/083049, mailed on Jun. 22, 2023", 9 pages.
"International Search Report and Written Opinion for Application No. PCT/EP2020/055369, mailed on Jun. 9, 2020", 12 pages.
"International Search Report and Written Opinion for Application No. PCT/EP2020/055370, mailed on Mar. 30, 2020", 15 pages.
"International Search Report and Written Opinion for Application No. PCT/EP2020/055371, mailed on Mar. 30, 2020", 15 pages.
"International Search Report and Written Opinion for Application No. PCT/EP2021/083049, mailed on Feb. 11, 2022", 14 pages.
"International Search Report and Written Opinion for Application No. PCT/EP2020/055372, mailed Mar. 30, 2020", 14 pages.
"International Search Report and Written Opinion received for PCT Patent Application No. PCT/EP2020/055367, mailed on Mar. 30, 2020", 14 pages.
"Office Action received for European Patent Application No. 20706348.8, mailed on Jul. 4, 2023", 5 pages.

(56) References Cited

OTHER PUBLICATIONS

"Office Action received for European Patent Application No. 20706349.6, mailed on Jul. 4, 2023", 5 pages.
"Office Action received for European Patent Application No. 20706350.4, mailed on Jul. 4, 2023", 5 pages.
"Office Action received for European Patent Application No. 20706351.2, mailed on Jul. 4, 2023", 7 pages.
Intego, "How to Limit Internet Access by Day and Time with Content Barrier", Retrieved from https://support.intego.com/hc/en-us/articles/207115178-How-to-Limit-Internet-Access-by-Day-and-Time-with-ContentBarrier, Jun. 10, 2019, 5 pages.
Kidslox, "Effectively Limit Child Screen Time With Parental Control App", Retrieved from the Internet: https://kidslox.com, Jul. 12, 2019, 4 pages.
Kidslox, "Parental Control by Kidslox", Google Playstore, Retrieved from the Internet: https://play.google.com/store/apps/details?id=com.kidslox.app&hl=en_IN, Jul. 12, 2019, 4 pages.
Valero, et al., "Improving the Security and QoE in Mobile Devices Through an Intelligent and Adaptive Continuous Authentication System", Sensors, vol. 18, 3769, retrieved from https://www.mdpi.com/1424-8220/18/11/3769, Nov. 4, 2018, 29 pages.

\* cited by examiner

USER AUTHENTICATION BASED ON BEHAVIORAL BIOMETRICS

PRIORITY CLAIM

The present disclosure is a National Phase entry of PCT Application No PCT/EP2020/066598, filed Jun. 16, 2020, which claims priority from EP application Ser. No. 19/186, 557.5 filed Jul. 16, 2019 and GB Application No. 1910169.0 filed Jul. 16, 2019, each of which is hereby fully incorporated herein by reference.

TECHNICAL FIELD

The present disclosure relates to the authentication of a user of a computing device. In particular, the present disclosure makes use of behavioral biometrics to authenticate a user.

BACKGROUND

User devices, such as portable computing devices, tablet computers, smartphones, mobile terminals and the like are becoming increasingly mobile and pervasive. As the mobility and pervasiveness of such devices has increased, so too has the amount of sensitive data that is typically stored on them. In order to protect any sensitive data stored on such devices, it is known to make use of access control measures, which require the user to be authenticated before they can access sensitive data.

Various authentication mechanisms have been used to provide access control for such user devices, including mechanisms which authenticate a user based on their knowledge of some secret (otherwise referred to as a knowledge factor), such as a password, number (e.g. a PIN) or pattern. Other mechanisms which have previously been used authenticate a user based on a physiological biometric measurement (otherwise referred to as a physiological biometric factor) of the user, such as through the use of fingerprints, speech recognition or facial recognition.

These authentication mechanisms require a user to provide input to a device specifically for the sole purpose of authentication (e.g. by entering a password or pressing their finger to a fingerprint scanner). As a result, these authentication mechanisms are typically viewed as a source of irritation by users since they require additional effort on the user's part and delay the user from carrying out their intended action. As devices become more mobile, a typical user's interactions with the device may become ever more brief, meaning that these authentication mechanisms (which will also be referred to herein as explicit authentication mechanisms) represent a proportionally greater burden on the user. For example, when carrying out very brief tasks on a mobile device such as when reading a received text message, the entry of the input needed to authenticate to the device may significantly increase the amount of time required for a user to complete the task.

Additionally, these authentication mechanisms only serve to authenticate the user at the point in time that the input is provided. After that point, there is a window of opportunity in which unauthorized users may gain access to the device and access any sensitive data that is stored on it. A common technique used to reduce this risk is to implement a timeout, whereby a device will enter a "locked" state after a certain period of inactivity and will require the user to re-authenticate before continuing to use the device. However, this technique still leaves a window of opportunity for unauthorized users to access sensitive data prior to the timeout occurring. Furthermore, due to the irritation that the authentication mechanism can cause users, users may seek to configure their devices to have a large delay before a timeout occurs (or even seek to disable the timeout mechanism entirely), such that a significant window of opportunity remains for unauthorized users to gain access to sensitive data on the device.

In order to address this problem, various so-called continuous authentication mechanisms have been proposed that seek to make use of behavioral biometrics to continuously authenticate that a user of the device is the correct user so as to improve the device's confidence that the user of the device is an authorized user at the time that a sensitive operation (such as accessing sensitive data) is actually carried out (as opposed to only verifying the user as an authorized user at a specific point in time, as is the case for the above-mentioned explicit authentication mechanisms).

Physiological biometrics rely on static (relatively) unique physical attributes of a user, such as their fingerprints, hand geometry, facial features or retina pattern. Since the physical attributes used for physiological biometrics are both relatively unique and static for a user (i.e. they will repeatably produce a particular unique value when they are measured), physiological biometrics can be readily adapted for use with existing authentication mechanisms. For example, a physiological biometric, such as a fingerprint, may be measured and associated with a particular user. Then, in order to later authenticate that a user of the device is that user, the physiological biometric can be re-measured and the resulting value compared to that that was previously associated with the user. This approach can also work well when a user of the device needs to authenticate their identity to a remote party (such as via a remote authentication server), since the value of the physiological biometric can be measured at the device and sent to the server for comparison with a known value of that physiological biometric for the user that is stored at the server. In this way, the value of a measured physiological biometric can be used analogously to a knowledge factor, such as a password (the measured value essentially being the "secret" in such cases).

Behavioral biometrics, on the other hand, aim at identifying invariant features of a particular user's behavior as they carry out various activities. Such activities may involve the user interacting with a device, such as by swiping or tapping a touch screen, typing on a keyboard or moving a mouse. Other activities may be unrelated to interaction with the device, but which can be sensed by the device when it is carried by the user, such as walking or speaking. A particular user will have various traits, such as their keystroke and mouse movement dynamics (e.g. typing rate and patterns) or their gait when walking, which together can be used to identify that the device is currently in the possession of a particular user. However, behavioral biometrics differ from physiological biometrics in that, whilst a particular physiological biometric may identify a particular user (with high probability), individual behavioral biometrics tend not to (e.g. there may be many users which have the same typing rate). In the case of behavioral biometrics, the identity of a user can typically only be determined (with a sufficiently high probability) by comparing their distinguishing traits across multiple behavioral biometrics (e.g. there may be fewer users which have the same typing rate and gait when walking). Furthermore, as the activities carried out by the user change, different sets of behavioral biometrics may be required to determine the user's identity (e.g. gait analysis is of little use if the user is not currently walking).

Due to the challenges presented by the nature of behavioral biometrics, machine learning has typically been used to train classifiers which classify whether a current user of the device is a particular authorized user (or not) based on multiple different behavioral biometrics as features. These classifiers are generally used in combination with the conventional access control measures discussed above. In particular, the continuous authentication approach may be used following a successful explicit authentication to detect whether the device has stopped being in the possession of the authenticated user. If such a change in possession of the device is detected, such continuous authentication mechanisms may cause the device to lock, requiring another successful explicit authentication before any sensitive data can be accessed.

Whilst such approaches may help to reduce the possibility for an unauthorized user to gain access to sensitive data on the device following a successful authentication by an authorized user, they still require the user to engage in an explicit authentication mechanism which remains a source of irritation to users of such devices. Additionally, where the authentication factor used for explicit authentication is compromised (such as where an unauthorized user learns an authorized user's password), the security of such devices may still be compromised.

Accordingly, it would be beneficial to mitigate these disadvantages.

SUMMARY

One of the problems encountered when trying to use behavioral biometrics as an authentication mechanism is that a user is typically only uniquely identifiable (at least within certain bounds of error) from the combination of multiple different behavioral biometrics, whereas most authentication mechanisms typically require a particular secret value to be generated in a repeatable fashion (whether through measurement of a static unique physiological biometric or entry of a knowledge factor such as a password). Whereas most previous approaches make use of machine learning to train a classifier based on multiple behavioral biometrics, this is generally not suitable as a sole authentication mechanism. In particular, it is difficult for such approaches to carry out authentication with remote parties as either the classifier must be run locally on the device and the classification result provided to the remote party (which may be susceptible to spoofing attacks) or the measured values must be provided to the remote party and the remote party must run the classifier (in which case the measured values themselves may be compromised and used as part of an attack). Furthermore, it is commonly desired to protect data stored on a device from other forms of attack (such as from a party bypassing the authentication mechanism and reading data directly from a devices memory). This is commonly achieved by encrypting the data stored on the device. However, whilst conventional explicit authentication mechanisms provide a secret value from which an encryption key could be derived, it is not readily apparent how this could be done using the conventional approaches to employing behavioral biometrics for authentication. It would therefore be desirable to provide an authentication mechanism which can reliably generate a secret credential from a user's behavioral biometrics (possibly together with other types of authentication factor, if increased levels of security are desired).

In a first aspect of the present disclosure, there is provided a computer implemented method for enrolling a user as an authenticated user of a computing device, the method comprising: identifying one or more behavioral biometrics upon which the authentication of the user is to be based; determining, for each of the behavioral biometrics, a typical measurement of that behavioral biometric for the user; determining a secret credential to be used to authenticate the user: generating a set of shares representing the secret credential in accordance with a secret sharing scheme, the set of shares comprising one or more shares that are generated based, at least in part, on the typical measurements of a respective one or more of the behavioral biometrics; and generating authentication data for the computing device, the authentication data indicating how to generate the set of shares including how to generate the one or more shares from measurements of the behavioral biometrics.

A plurality of behavioral biometrics may be identified. The one or more behavioral biometrics may comprise one or more behavioral traits associated with one or more or all of: touch screen interactions, including taps and swipes: typing patterns: device orientation; gait; and geographical location.

Generating one or more shares based, at least in part, on the typical measurements of a respective one or more of the behavioral biometrics may comprise generating a respective set of coefficients for each of the one or more shares. The set of coefficients comprises a respective coefficient for each of the one or more behavioral biometrics from which the share is to be generated. The share may be generated by combining the typical measurements of the respective one or more behavioral biometrics with the associated coefficient in the respective set of coefficients.

The set of shares may each be generated based, at least in part, on the typical measurements of a respective one or more of the behavioral biometrics; and the authentication data may indicate how to generate each of the set of shares based on measurements of the respective one or more of the behavioral biometrics.

At least one of shares in the set of shares may be generated based on the typical measurements of a respective plurality of the behavioral biometrics.

The set of shares may comprise one or more shares that are generated based, at least in part, on a typical measurement of a physiological biometric for the user; and the authentication data may further indicate how to generate the one or more shares based on at least one of a measurement of the physiological biometric.

The set of shares may comprise one or more shares that are generated based, at least in part, on a knowledge factor known to the user; and the authentication data may further indicate how to generate the one or more shares based on a copy of the knowledge factor provided by a user.

Each of the shares in the set of shares may be generated based solely on the typical measurements of a respective one or more of the behavioral biometrics.

The secret sharing scheme may enable the recreation of the secret credential from any subset of the set of shares that comprises at least a predetermined number of shares. The one or more shares that are generated based on the typical measurements of the one or more behavioral biometrics may comprise more than the predetermined number of shares.

The method may be performed by an authentication server and may further comprise: providing the authentication data to the computing device. The authentication data may be provided to the computing device in response to an authentication request. The authentication data may be provided to the computing device as part of an enrolment process to enroll a user as an authenticated user for the computing device. The method performed by the authentication server may further comprise: deriving a cryptographic key from the secret credential: encrypting an item of data using the cryptographic key; and providing the encrypted data to the computing device.

The method may be performed by the computing device and the method may further comprise: receiving the secret credential from an authentication server: storing the authentication data in a memory of the computing device; and erasing the secret credential from the computing device. The method performed by the computing device may further comprise: deriving an cryptographic key from the secret credential: encrypting an item of data using the cryptographic key; and storing the encrypted data.

In a second aspect of the present disclosure, there is provided a computer implemented method for authenticating a user of a computing device, the method comprising: receiving authentication data indicating how a set of shares representing a secret credential in accordance with a secret sharing scheme can be generated including how to generate one or more shares of the set of shares based, at least in part, on measurements of one or more behavioral biometrics of a user; analyzing an output from one or more sensors of the computing device to determine a respective measurement for each of the behavioral biometrics for a current user of the computing device: generating a set of shares as indicated by the authentication data, including generating the one or more shares based on the respective measurements of the behavioral biometrics; recreating a copy of the secret credential based on the generated set of shares in accordance with the secret sharing scheme; and authenticating the user in response to a determination that the recreated copy of the secret credential matches the secret credential.

A plurality of behavioral biometrics may be indicated by the authentication data. The one or more behavioral biometrics may comprise one or more behavioral traits associated with one or more or all of: touch screen interactions, including taps and swipes: typing patterns: device orientation: gait; and geographical location.

The authentication data may comprise a respective set of coefficients for each of the one or more shares. Each set of coefficients may comprise a respective coefficient for each of one or more behavioral biometrics from which the share is to be generated. The one or more shares may be generated by combining the measurements of the one or more behavioral biometrics with the associated coefficient in the respective set of coefficients.

The secret sharing scheme may enable the recreation of the secret credential from any subset of the set of shares that comprises at least a predetermined number of shares; and generating a set of shares may comprise generating a subset of the set of shares indicated by the authentication data, the subset comprising at least the predetermined number of shares, wherein one or more of the shares is generated based on the respective measurements of the behavioral biometrics.

The subset of the set of shares may comprise more than the predetermined number of shares; recreating a copy of the secret credential may comprise recreating a plurality of copies of the secret credential, each of the copies being generated based on a different combination of at least the predetermined number of shares; and the user may be authenticated in response to a determination that any of the recreated copies of the secret credential matches the secret credential.

The authentication data may indicate how to generate each of the set of the shares, based, at least in part, on measurements of a respective one or more of the behavioral biometrics. The authentication data may indicate how to generate at least one of the shares in the set of shares based, at least in part, on the measurements of a respective plurality of the behavioral biometrics. Generating the set of shares may comprise generating each of the plurality of shares based on the respective measurements of the respective one or more of the behavioral biometrics as indicated by the authentication data.

The authentication data may further indicate that one or more of the set of shares is to be generated based, at least in part, on a typical measurement of a physiological biometric for a user, in which case the method may further comprise obtaining a measurement of the physiological biometric for the current user of the computing device; and generating the set of shares comprises generating one or more of the set of shares based on the measurement of the physiological biometric, as indicated by the authentication data.

The authentication data may further indicate that one or more of the set of shares is to be generated based, at least in part, on a knowledge factor provided by a user, in which case the method may further comprise obtaining a copy of the knowledge factor from the current user of the computing device; and generating the set of shares comprises generating one or more of the set of shares based on the copy of the knowledge factor, as indicated by the authentication data.

The authentication data may indicate that each of the set of shares is to be generated based solely on measurements of a respective one or more of the behavioral biometrics.

Authenticating the user may comprise: generating an authentication message based on the copy of the secret credential: providing the authentication message to an authentication server; and receiving a response to the authentication message from the authentication server, the response indicating that the user is authenticated when the copy of the secret credential matches the secret credential.

The method may further comprise: deriving a cryptographic key from the secret credential; and decrypting or encrypting an item of data using the cryptographic key.

In a third aspect of the present disclosure, there is provided a computer system comprising a processor and a memory storing computer program code for performing the method of the first or second aspects.

In a fourth aspect of the present disclosure, there is provided a computer program which, when executed by one or more processors, is arranged to carry out the method of the first or second aspects.

Through the use of a secret sharing scheme, embodiments of the present disclosure enable a secret credential for a user to be embodied in, and recreated from, a set of shares. Specifically, a computing device can be provided with information which allows it to generate the set of shares which are required to reproduce the secret credential whenever it needs access to the secret credential to authenticate the user. Accordingly, the secret credential can be generated by the device whenever it is needed and does not need to be stored on the device in a way that may be compromised. Various combinations of different types of authentication factors may be used to generate the shares. For example, the set of shares may be generated solely from the user's behavioral biometrics. That is to say, each of the shares may be derived from some respective combination of one or more behavioral biometrics of the user. Accordingly, the recreation of the secret credential is dependent on the device measuring values for at least some, if not all, of the behavioral biometrics which are consistent with the authorized user. Where the secret sharing scheme uses a threshold which is less than the number of shares indicated as being part of the set, the secret credential can be recreated provided the number of behavioral biometric measurements that are consistent with the authorized user is greater than this threshold. Therefore, the invention can enable the secret credential to be recreated even if not all of the user's behavioral biometric measurements can currently be detected by the device (i.e. if not all of the behavioral biometrics are present). In other examples, some of the shares may be generated based on other factors, such as a knowledge factor, like a password, or a physiological biometric factor, like a fingerprint. In such cases, the recreation of the secret credential is at least partially dependent on the presence of one or more of the behavioral biometrics, thereby improving the security of such a system over the use of the other factors in isolation, even if the entry of those other factors might still cause irritation to the user. Furthermore, the secret credential that is derived from the behavioral biometrics (via the shares that are generated from those behavioral biometrics) can be unique to the user and reliably generated such that it is suitable for use in authentication schemes involving remote systems (e.g. an authentication server) or for encrypting sensitive data at rest in the memory of the device.

BRIEF DESCRIPTION OF THE DRAWINGS

Embodiments of the present disclosure will now be described by way of example only, with reference to the accompanying drawings, in which.

DETAILED DESCRIPTION OF EMBODIMENTS

Figure 1:
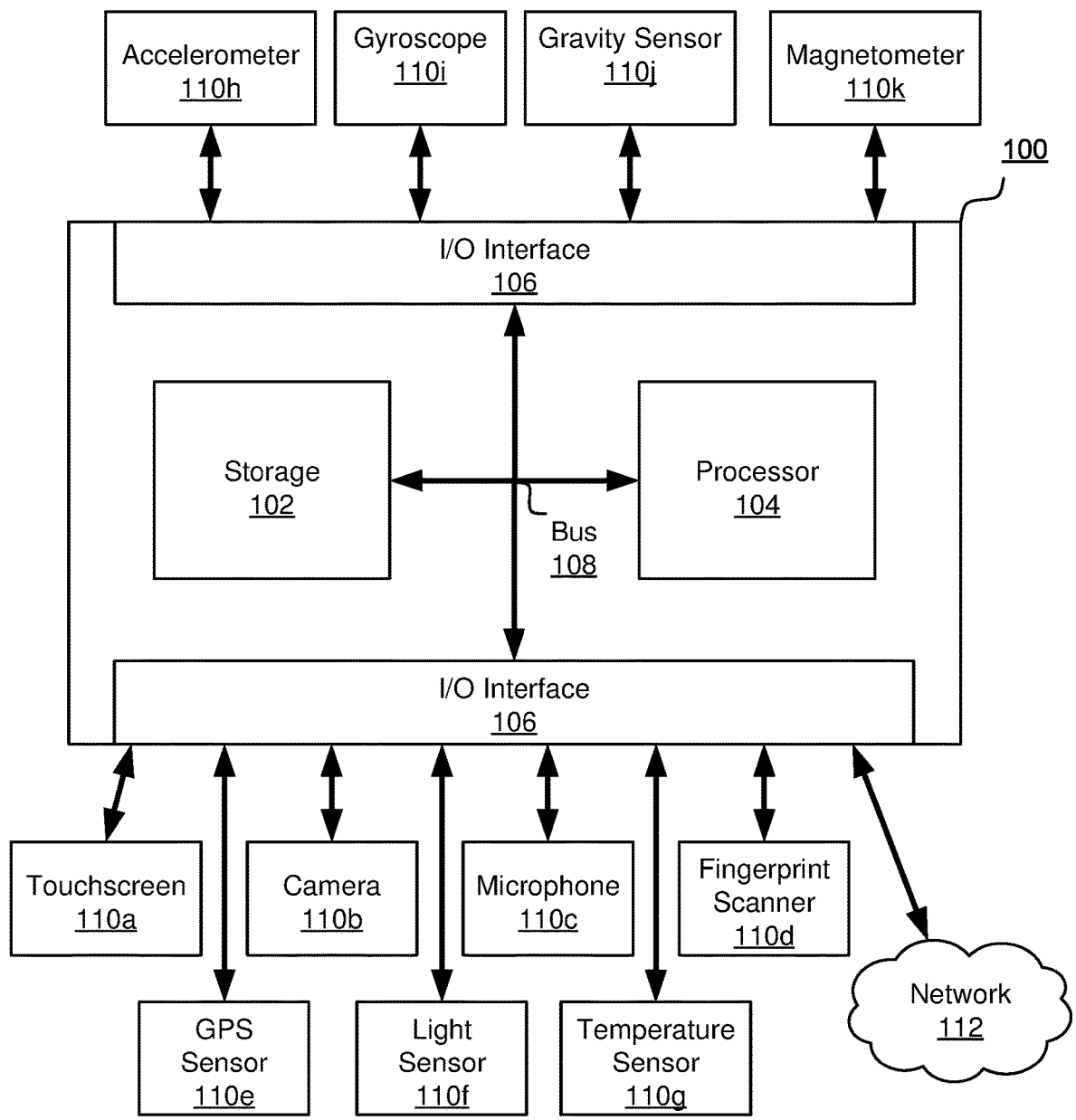
FIG. 1 is a block diagram of a computer system suitable for the operation of embodiments of the present disclosure.

FIG. 1 is a block diagram of a computer system 100 suitable for the operation of embodiments of the present disclosure. The system 100 comprises a storage 102, a processor 104 and one or more input/output (I/O) interfaces 106, which are all communicatively linked over one or more communication buses 108.

The storage (or storage medium or memory) 102 can be any volatile read/write storage device such as a random access memory (RAM) or a non-volatile storage device such as a hard disk drive, magnetic disc, optical disc, ROM and so on. The storage 102 can be formed as a hierarchy of a plurality of different storage devices, including both volatile and non-volatile storage devices, with the different storage device in the hierarchy providing differing capacities and response times, as is well known in the art.

The processor 104 may be any processing unit, such as a central processing unit (CPU), which is suitable for executing one or more computer programs (or software or instructions or code). These computer programs may be stored in the storage 102. During operation of the system, the computer programs may be provided from the storage 102 to the processor 104 via the one or more buses 108 for execution. One or more of the stored computer programs are computer programs which, when executed by the processor 104, cause the processor 104 to carry out a method according to an embodiment of the invention (and accordingly configure the system 100 to be a system 100 according to an embodiment of the disclosure). The processor 104 may comprise multiple processing cores, either contained in a single chip or distributed across multiple chips (i.e. the processor 104 may be a multiprocessor), as is known in the art.

The one or more input/output (I/O) interfaces 106 provide interfaces to devices 110 for the input or output of data, or for both the input and output of data. The devices that are connected to the system 100 via the interfaces 106 may include one or more devices that are intended to either obtain input from a user or provide input to a user, or both. For example, a touchscreen 110a may be connected to the system 100 to provide information to the user via images output to the touchscreen's display and allow the user to provide input by touching or swiping different points on the touchscreen 110a. However, in alternative embodiments, the touchscreen may be replaced by, or augmented with one or more of: a keyboard, a mouse, a number pad and a non-touchscreen display. The devices 110 that are attached to the system 100 via the I/O interfaces may further include one or more sensors that provide an input based on sensed parameters of the physical environment in which the system 100 is operating. For example, the devices 110 may include one or more of: a camera 110b, a microphone 110c, a fingerprint scanner 110d, a GPS sensor 110e, a light sensor 110f, a temperature sensor 110g, an accelerometer 110h, a gyroscope 110i, a gravity sensor 110j and a magnetometer 110k. Although any other sensor may be used instead or in addition, as will be appreciated by those skilled in the art. The one or more input/output (I/O) interfaces 106 may further include one or more network interfaces to enable the computer system 100 to communicate with other computer systems via one or more networks 112. As will be appreciated, any suitable type of network 112 may be utilized by computer system 100 to communicate with other computer systems, including communication via both wired and wireless media, such as, for example, Bluetooth, WiFi or mobile communications networks.

It will be appreciated that the architecture of the system 100 illustrated in FIG. 1 and described above is merely exemplary and that other computer systems 100 with different architectures (such as those having fewer components, additional components and/or alternative components to those shown in FIG. 1) may be used in embodiments of the invention. As examples, the computer system 100 could comprise one or more of a personal computer: a laptop: a tablet: a mobile telephone (or smartphone); an Internet of Things (IoT) device; and a server. The devices 110 that interface with the computer system 100 may vary considerably depending on the nature of the computer system 100 and may include devices not explicitly mentioned above, as would be apparent to the skilled person.

Figure 2:
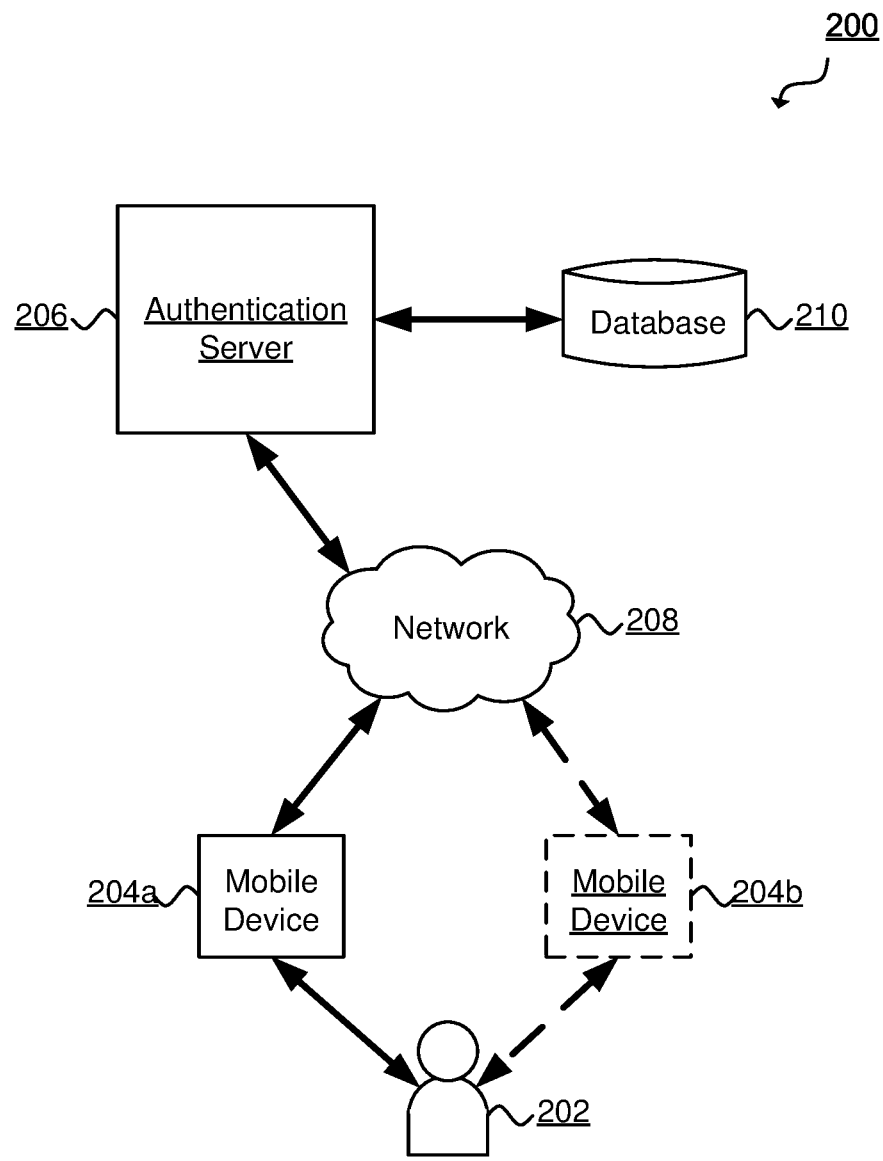
FIG. 2 is a block diagram of an arrangement of computer systems in which embodiments of the disclosure may operate.

FIG. 2 is a block diagram of an arrangement 200 of computer systems 100 in which embodiments of the disclosure may operate. In this arrangement, a user 202 may interact with a mobile device 204 for which the user is authorized to access. The mobile device 204 is a type of computer system 100, as already discussed above. The mobile device 204 is communicatively coupled to an authentication server 206 via a network 208. The authentication server 208 may in turn be connected to a database 210 which may be used to store authentication credentials which can be used to authenticate a user. In some embodiments, the user 202 may interact with multiple mobile devices 204, such as mobile device 204a and mobile device 204b. However, in other embodiments, the user 202 only interacts with a single mobile device 204. In accordance with some embodiments of the invention, as discussed in more detail below, the mobile device 204 is configured to enable the authorized user 202 to be authenticated through communication with the authentication server 206. That is to say, the authentication is performed jointly by the mobile device 204 and the authentication server 206. However, in other embodiments, the mobile device 204 may be configured to authenticate the user 202 without needing to communicate with the authentication server 206. That is to say, in such embodiments, the authentication is performed solely by the mobile device 204. Naturally, in such embodiments, it is not necessary for an authentication server 206 (or associated database 210) to be provided and the mobile device need not necessarily be connected to a network 208.

Figure 3:
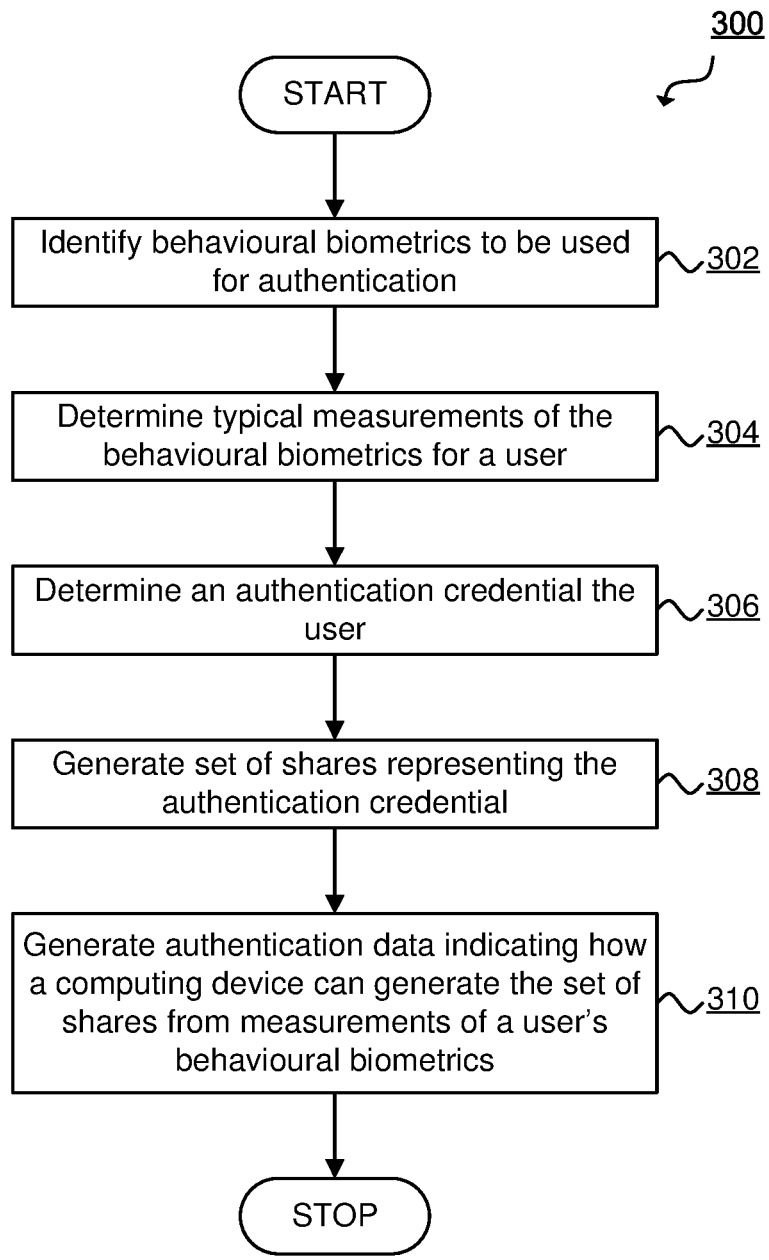
FIG. 3 is a flowchart that schematically illustrates a method for enrolling a user as an authenticated user of a computing device.

FIG. 3 is a flowchart that schematically illustrates a method 300 for enrolling a user 202 as an authenticated user of a computing device 100, such as mobile device 204a or 204b. In some embodiments, the method 300 may be performed by the authentication server 206. However, in other embodiments, the method 300 may be performed locally by the mobile device 204 itself.

At an operation 302, the method 300 identifies one or more behavioral biometrics upon which the authentication of the user is to be based. As discussed above, behavioral biometrics are measurements of some aspect of a user's behavior during their normal activities (either when actively interacting or when simply carrying the device about with them on their person such that other activities such as walking may be sensed by the device). As will be appreciated, there are a wide range of behavioral biometrics which can be detected through the various sensors that the computing device 100 may have access to. For example, touchscreen interactions, including gestures such as swipes, strikes, pinches, scrolls and/or taps, may be sensed via a touchscreen 110a of the device 100. The data provided by the touchscreen 110a may therefore yield various features that can help to distinguish a particular user from other users. Such features are considered to be behavioral biometrics. For example, the pressure applied, stroke length and/or duration of any touchscreen interactions may be measured and are likely to be different for different users, yet consistent for a particular user. Other sensors may yield other behavioral biometrics, for example, a GPS sensor 110e (or any other geographical positioning mechanism) may be used to determine usual locations for a user. Similarly, information retrieved from sensors, such as an accelerometer 110h, gyroscope 110i, gravity sensor 110j and/or magnetometer may be used to determine other distinguishing features of a particular user, such as their gait, or the way in which they hold their phone (e.g. a typical device orientation). As a further example, tapping or typing patterns on a keyboard (either virtual or physical) may be monitored and behavioral biometrics relating to these patterns (which may be referred to as keystroke dynamics) can be used. Similarly, the semantic content of data entered into the phone (whether by virtual or physical keyboard or by voice via a microphone 110c, or in any other way), may be analyzed to determine linguistic behavioral biometrics relating to patterns in the language that is used by the user to express themselves (for example, frequencies of use of different words). All these features are considered to be behavioral biometrics. In general, any form of suitable behavioral biometric that can help distinguish one user from another (either alone or in combination with other behavioral biometrics) and which may be sensed by the computing device 100 may be used.

As with other applications of behavioral biometrics, it is necessary to generate the measurements of the behavioral biometrics in a manner which yields repeatable results and yet still provides some utility for distinguishing particular users from other users (when multiple behavioral biometrics are combined). The skilled person would be readily familiar with techniques for doing this. For example, the granularity (or accuracy) with which each behavioral biometrics is measured may be lowered to ensure that repeated measurements are likely to provide the same result at the level of granularity that is chosen. Similarly, measurements may be classified into broader categories that the measurements belong to and each such category may be associated with a particular value. Additionally, normalization techniques may be used to normalize the data that is provided by the sensors. For example multiple measurements of a particular feature may be averaged to provide an average measurement for that feature (such as an average speed of touch, or an average length of stroke and so on). Similarly, data from other sensors may be used to normalize the data that is read from another sensor (e.g. data from a gravity sensor 110j may be used to normalize data from an accelerometer 110h so that it is relative to a "real world" coordinate system rather than being relative to the computing device 100). The skilled person would be readily familiar with these, as well as other, techniques that may be used to ensure that the measurements of the behavioral biometrics are captured in a manner which is repeatable.

In some embodiments of the invention a single behavioral biometric may be used. Although a single behavioral biometric is unlikely to be able to uniquely distinguish one user from all other users, such embodiments combine the use of the single behavioral biometric with other authentication factors, such as knowledge factors (e.g. passwords) or physiological biometrics (e.g. fingerprints) (or both), to help improve the security provided by those other authentication factors as part of a multi-factor authentication scheme.

However, in other, more preferred, embodiments of the invention, multiple different behavioral biometrics are used. By using a plurality of behavioral biometrics it improves the security provided by the authentication mechanism by making it more likely that a particular user can be reliably authenticated based solely on their behavioral biometrics.

In some embodiments, when determining the behavioral biometrics upon which the authentication of the user is to be based, a selection is be made from amongst a broader range of behavioral biometrics based on the capabilities of the computing device 100 which the user is being enrolled with. That is to say, the available sensors of the computing device 100 may be analyzed to determine which of the broad range of behavioral biometrics can be measured by the computing device 100. Of course, in other embodiments, a static set of behavioral biometrics that is known to be measurable by the computing device 100 may be used. It is also possible, though possibly not ideal, in some embodiments for the method 300 to use some behavioral biometrics that cannot actually be measured by the computing device 100. This is because, as discussed in more detail below, the authentication method provided by the present disclosure can, in some embodiments, enable the secret credential to be recreated from a subset of the behavioral biometrics. Therefore, so long as a sufficient number of behavioral biometrics can be measured by the computing device 100, it is possible to tolerate the inclusion of some behavioral biometrics that cannot be measured. Such embodiments may allow the same authentication data to be provided to multiple devices, each of which may have different sensing capabilities (although, in preferred embodiments, the authentication data is generated individually for each device using as set of behavioral biometrics that is appropriate for that device).

In some embodiments, when determining the behavioral biometrics that are to be used the authentication server 204 (or, in other embodiments, the computing device 100) may analyze the available behavioral biometrics to identify those behavioral biometrics that are most repeatable or most distinguishing (or both) for the user that is being enrolled. A subset of the available behavioral biometrics that are most repeatable or most distinguishing (or both) may be selected for use with the method 300.

Having identified the one or more behavioral biometrics upon which the authentication of the user is to be based at operation 302, the method proceeds to an operation 304.

The typical measurement of each behavioral biometric represents a measurement of that behavioral biometric that can be repeatably obtained for the user of the device (at least whenever the user is carrying out the activity from which the behavioral biometric is derived).

In some embodiments, typical measurements of the behavioral biometrics may already be known. For example, they may be stored in association with the user in a database 210 associated with the authentication server 206. Alternatively, another computing device, such as mobile device 204b, with which the user is already enrolled as an authenticated user may have already determined these typical measurements for use by that device to authenticate user. In such cases, the typical measurements may be taken from or provided by that other device. These known typical measurements may then be retrieved by the authentication server or the computing device 100 (depending on which device is performing the method 300) and used as part of the method 300 to enroll the user on the computing device 100.

In other embodiments, the typical measurements may be determined by the computing device 100 with which the user is being enrolled as part of an enrolment phase. In such embodiments, the computing device 100 may monitor the output from various sensors over a predetermined period of time in order for the typical measurements to be determined. Alternatively, where historical data from the sensors is already available, this may be analyzed to determine the typical measurements without needing to carry out an enrolment phase. Where the method 300 is being performed by the authentication server 206, the computing device 100 may provide the determined typical measurements to the authentication server 206 (or, alternatively, may provide the output from the sensors to allow the authentication server 206 to determine the typical measurements).

Having determined a typical measurement of each of the selected behavioral biometrics at operation 304, the method 300 proceed to an operation 306.

At operation 306, the method 300 determines a secret credential to be used to authenticate the user.

In some embodiments, the secret credential may be a pre-existing credential that is already associated with the user. For example, a secret credential may be stored in association with the user in the database 208. This may be the case, for example, where the user has already registered with an authentication server, possibly from another device, such as mobile device 204b. In such embodiments, the secret credential for the user may be retrieved, such as by looking it up in the database 208 (when the method 300 is performed by the authentication server 206) or by receiving it from an authentication server 206 (when the method 300 is performed by the computing device 100).

However, in other embodiments, a new credential is generated for use in authenticating the user. Any suitable technique for generating a credential for use for this purpose may be used including, for example, randomly generating the credential. This may be used, for example, when the enrolment is being performed at the computing device 100 itself without the involvement of any authentication servers 206. Of course, in some embodiments where an authentication server 206 is involved, a new credential may be generated by the authentication server 206 if no pre-existing credential is available (or suitable).

Having determined a secret credential to be used to authenticate the user, the method 300 proceeds to an operation 308.

At operation 308, the method 300 generates a set of shares representing the secret credential in accordance with a secret sharing scheme.

As will be known by those skilled in the art, secret sharing schemes (which may also be referred to as secret splitting schemes) refer to methods for distributing a secret S amongst a number n of secret shares $S_1, \ldots, S_n$ (also referred to herein as shares) in such a way that the secret S can be computed (or recreated) from the combination of any t or more secret shares $S_n$, but cannot be recreated from any combination of t−1 or fewer shares $S_n$. Since the secret S can be recreated from the shares $S_n$, it can be considered that the set of secret shares $s_1, \ldots, s_n$ collectively form a secure representation of the secret. The number t of shares $S_n$ that are required to recreate the secret S may be referred to as the threshold of the secret sharing scheme. There are many known secret sharing schemes and any suitable secret sharing scheme may be used in embodiments of the invention.

One example of a secret sharing scheme that may be used with embodiments of the invention is Shamir's secret sharing scheme, the details of which were initially set out in the paper "*How to Share a Secret*" by Adi Shamir published in Communications of ACM, Volume 22, Number 11, November 1979. As will be known, this system makes use of the idea that a polynomial of order t−1 is only completely defined by a set of at least t points that lie on that polynomial or, in other words, fewer than t points are insufficient to define a unique polynomial of degree t−1. Accordingly, the method used by Shamir's secret sharing scheme involves defining a polynomial of degree t−1, i.e.

$$f(x)=a_0+a_1 \cdot x+a_2 \cdot x^2+ \ldots +a_{t-1} \cdot x^{k-1}$$

with the first coefficient $a^0$ being set as the secret S, and the remaining coefficients $a_1, a_2, \ldots a_{t-1}$ being picked at random. Having defined a specific polynomial in which the secret S is embedded as the first coefficient $a_0$, any n points on the polynomial are then found. These n points form the secret shares $s_1, \ldots, s_n$. These secret shares $s_1, \ldots, s_n$ represent the secret S because when at least t of the secret shares $S_n$ are known then t points lying on a polynomial in which the secret S is embedded are known. From these t points, it is possible to recreate the unique polynomial of degree t−1 and thereby recover the secret S which is embedded as the first coefficient $a_0$ of the polynomial.

However, other secret sharing schemes, such as Blakley's secret sharing scheme (details of which were initially set out in the paper "Safeguarding cryptographic keys", by G. R. Blakley published as part of Managing Requirements Knowledge, International Workshop on (AFIPS) 48 313-317, 1979) may be used instead.

Conventionally, secret sharing schemes, such as Shamir's secret sharing scheme, have been used to distribute a secret S amongst a group of participants, each of whom is allocated a share $S_n$ of the secret. The secret can only be reconstructed when a sufficient number, t (the threshold number), of shares are combined. By using such secret sharing schemes in this manner, conventional applications of secret sharing schemes help to enforce security requirements that a certain number, t, of the group of participants must be present and cooperate before the secret S will be revealed (or at least require that a certain number t of the participants have their shares $S_n$ compromised for an attacker to be able to access the secret S).

The use of secret sharing schemes by the present invention is different from this conventional use. In the present disclosure, the set of shares $S_n$ that is generated is intended to be provided to a single user (or at least information about how to generate the set of shares for a user is provided to the computing device, as discussed in more detail below). The secret S that is represented by the set of shares $S_n$ in the present invention is a secret credential for that user. If the user is able to recreate the secret credential (that is, if the computing device is able to recreate the secret credential based on information about the user), then they are considered to have been authenticated. Due to the way in which the secret sharing scheme is applied in this invention, the secret credential S will only be able to be recreated if at least a certain number t of shares $S_n$ of the secret credential S can be obtained by the computing device (whereby the certain number t is the threshold of the secret sharing scheme). Therefore, by making the generation of one or more of the shares $S_n$ dependent on one or more behavioral biometrics of the user, the generation of the secret credential S can be directly dependent on the behavioral biometrics of the user. That is to say, the behavioral biometrics form an integral part of the authentication scheme rather than lying outside it as a separate verification measure.

As will be appreciated, there are numerous ways to generate one or more of the shares from the typical behavioral biometrics of the user. Conceptually, this may be also be considered as specifying one or more of the shares in terms of the typical behavioral biometrics. Accordingly, a set of shares may be generated using the secret sharing scheme. For example, using Shamir's secret sharing scheme, a polynomial of degree t-1 may be specified in which the secret credential S forms the first coefficient and the other coefficients may be picked at random, i.e.

$$f(x)=S+a_1 \cdot x+a_2 \cdot x^2+ \ldots +a_{t-1} \cdot x^{k-1}$$

Next, a number n of points $p_1, \ldots p_n$ on the polynomial are determined by evaluating f(1), ... f(n) respectively. These points form the n shares $S_n$ of the secret credential S (i.e. $s_1=p_1, \ldots s_n=p_n$). Therefore, in order to define any of the shares $s_n$ in terms of one or more typical measurements of a user's behavioral biometrics $B_m=\{b_1, \ldots, b_m\}$, one can specify any suitable method of combining the behavioral biometrics in a way that results in the value of the share $s_n$. For example, an equation can be specified in which each of the behavioral biometrics $B_m$ is multiplied by a respective coefficient $C_m=\{c_1, \ldots c_m\}$ and the value of which is then modified by a residual value r as follows:

$$s_n=c_1 \cdot b_1+ \ldots +c_m \cdot b_m+r$$

The share $s_n$ may therefore be considered to be (i.e. may be specified in terms of) the coefficients $C_m$, the measurements of the user's behavioral biometrics $B_m$ and a residual value r. Therefore, a computing device will be able to generate (or recreate) the secret $s_n$ given only the coefficients $C_m$ and the residual value r by taking its own measurements of the behavioral biometrics when the authenticated user is using the device. This is because the measurements of the behavioral biometrics will normally correspond to the typical measurements $B_m$ of the user's behavioral biometrics when the authenticated user is using the device (and are unlikely to correspond if a different user is using the device).

Of course it will be appreciated that any other suitable technique of specifying a share $s_n$ of a secret sharing scheme in terms of one or more typical measurements of a user's behavioral biometrics $B_m$ may be used instead.

In some embodiments multiple shares are generated (or specified) in terms of the typical measurements of the user's behavioral biometrics such that the set of shares comprises a plurality of shares that are each generated based on a respective subset of the typical measurements of the user's behavioral biometrics. This improves the security of the authentication mechanism that is provided since individual behavioral biometrics may not differentiate between different users very strongly.

In some embodiments, some of the shares may be generated (or specified) based on factors other than the typical measurements $B_m$ of a user's behavioral biometrics. For example, in some embodiments some of the shares may be generated based on a typical measurements $P_p=\{p_1, \ldots, p_p\}$ of one or more physiological biometrics for the user, such a fingerprint measurement. In other embodiments, some of the shares may be generated based on one or more knowledge factors $K_k=\{k_1, \ldots, k_k\}$ known to the user, such as a PIN number. Such shares may be specified such that they are generated solely in dependence on the other factors, or in combination with the behavioral biometric factors, for example, in general the above equation can be modified to include additional coefficients for these other factors:

$$s_n=c_1 \cdot b_1+ \ldots +c_m \cdot b_m+c_{m+1} \cdot p_1+ \ldots c_{m+p} \cdot p_p+c_{m+p+1} \cdot k_1+ \ldots +c_{m+p+k} \cdot k_k+r$$

Conceptually any of the factors can be excluded by setting the associated coefficient to 0. Of course, it will be appreciated that in reality any zero-valued coefficients may be excluded and the factors that are to be included in the equation specified via other means.

Accordingly, in some embodiments, the generation of some of the shares $s_n$ is specified solely in terms of factors other than behavioral biometrics, such as knowledge factors or physiological biometric factors. In other words, for such shares, the coefficients $C_1, \ldots C_m$ may conceptually be considered to be 0. In other embodiments, all of the shares $S_n$ may be specified, at least in part, one or more of the typical measurements $B_m$ of the user's behavioral biometrics (possibly in addition to other types of factor).

By incorporating other factors into the generation of some of the shares $s_n$, the generation of the secret credential S can be directly dependent on the behavioral biometrics in combination with the other factors, such as knowledge factors (e.g. a password). This can improve the security of such systems over a system in which an explicit authentication is carried out based solely on another factor, such as a knowledge factor (e.g. a password), and then continuous authentication is separately carried out, because it is more resilient to the other factor being compromised (e.g. an unauthorized user learning an authorized user's password).

Additionally, as will be discussed further below, by specifying some of the shares $S_n$ solely in terms of other factors, the system may be made more flexible in the face of ambiguity for some measurements of the user's behavioral biometrics. This can reduce the likelihood of an authorized user being falsely rejected during authentication.

However, in yet other embodiments, all of the shares $S_n$ may be solely specified in terms of the typical measurements of the user's behavioral biometrics. In such embodiments, each of the shares can be generated based solely on the typical measurements $B_m$ of a respective one or more of the behavioral biometrics. That is, different subsets of the set of typical measurements $B_m$ of behavioral biometrics can be used in the generation of each of the shares. By basing the generation of each of the shares $S_n$ on the typical measurements $B_m$ of the behavioral biometrics, the secret credential S can be recreated by the computing device 100 using only behavioral biometrics, which can be gathered from the user without requiring any specific input from the user. Accordingly, the user can be authenticated in a way that is highly convenient as they need not be interrupted or delayed from carrying out any intended tasks by the authentication mechanism of the present invention. This is because the secret credential S can be calculated from measurements of the user's behavioral biometrics as they interact with the computing device 100 in their normal way.

In some embodiments, each of the shares $S_n$ may be specified in terms of the typical measurement of a different respective one of the behavioral biometrics, such that measurements of each behavioral biometric is only used to generate a respective one of the shares $S_n$.

In order to achieve a low false rejection rate (FRR), it is desirable that the behavioral biometrics upon which the shares are generated are reliably present whenever the authenticated user is using the computing device. As discussed above in relation to operation 302 of the method 300, this can be achieved through the selection of appropriate behavioral biometrics. In particular, those behavioral biometrics that are most reliably present for a particular user may be chosen for the authentication mechanism. Similarly, the measurements of these behavioral biometrics upon which the authentication mechanism is to be based may be normalized through various operations as already discussed. Additionally, the measurements may be specified as being taken at a certain level of granularity (or resolution) to improve the probability that the same value will be measured whenever the user is operating the computing device 100. However, the use of the secret sharing scheme provides an additional mechanism through which the FRR can be improved. Specifically, through the specification of a suitable threshold t for the secret sharing scheme which is less than the total number of shares $S_n$ that are generated (i.e. when t<n), the authentication mechanism can be made resilient to the legitimate absence of some of the behavioral biometric factors (i.e. resilient to situations where the measurements of those behavioral biometric factors do not correspond to the typical measurements for the user). For example, some behavioral biometrics might only be present when the user is carrying a particular activity (e.g. a user's gait can only be relied upon when the user is walking). However, such behavioral biometrics may be very distinctive for the user when they are carrying out that particular activity. Therefore, rather than ignore such behavioral biometrics completely, an appropriate threshold t can be set meaning that only t of the total n secrets need to be recreated. Accordingly, by ensuring an appropriate distribution of the use of the behavioral biometric measurements to generate each secret (e.g. such as by using a single different behavioral biometric measurement in the generation of each secret), the mechanism can ensure that the secret credential S can be recreated, even if some of the behavioral biometrics are missing, provided that a sufficient number have been reliably reproduced to enable the generation of the threshold t number of secrets. As an example, such a system may be designed by identifying a minimum number of the behavioral biometrics that have been chosen for authenticating the user which are reliably present at any given time and setting the threshold t of the secret sharing scheme to that number. In other examples, the threshold t may be set higher than this if this would result in an unacceptably high false acceptance rate (FAR), albeit at the possible expense of a higher FRR.

Similarly, where a threshold t is specified that is lower than the total number n of secrets $S_n$, additionally flexibility may be introduced by specifying some secrets $S_n$ such that they can be generated based solely on other factors, such as knowledge factors or physiological biometric factors. This means that when an insufficient number (i.e. less than t) of shares $S_n$ can be generated to authenticate the user solely on the basis of measurements of the user's behavioral biometrics, the user can be invited to compensate by providing the additional inputs (such as a password or a measurement of a fingerprint) to enable additional shares $S_n$ to be generated such that a sufficient number of shares $S_n$ may then be present to successfully authenticate the user.

Having generated the shares $S_n$ representing the secret credential S, the method 300 proceeds to an operation 310.

At an operation 310, the method 300 generates authentication data for the computing device. The authentication provides information to the computing device to allow the device 300 to authenticate the user using the secret credential S and measurements of a user's behavioral biometrics taken at (or proximal to) the time when the authentication is conducted, whereby the device 300 will successfully authenticate the user as being the user enrolled by this method 300 if the measurements of the behavioral biometrics taken at (or proximal) to the time of authentication match the typical measurements used during this method 300. Accordingly, the authentication data indicates how to generate (or recreate) the set of shares that were generated at operation 308. This includes how to generate the one or more shares that are to be generated from measurements of the behavioral biometrics. Additionally, where the set of shares includes shares that are not generated from measurements of the behavioral biometrics, the authentication data indicates how those other shares can be generated (or otherwise obtained).

As an example, the authentication data may include an indication of a set of behavioral biometrics $B_m=\{b_1, \ldots b_m\}$ that are to be measured to authenticate a user. This indication may also include indications of any parameters that are to be used when measuring each of those behavioral biometrics (such as an indication of a level of granularity or a normalization technique or classification technique, or any combination of these) to be used (although in some cases, the raw output or standard measuring techniques used by the device may be relied on instead or this information may be communicated separately via other means). For each of the shares $S_n$ that is to be generated from the behavioral biometrics, the authentication data includes an indication of how that share can be generated from the behavioral biometrics. For example, for each of the shares, a collection of coefficients $C_m$ and a residual value r may be included in the authentication data. Where the shares include shares that are based on other factors $F_a=\{f_1, \ldots, f_a\}$, additional coefficients $C_a=\{c_1, \ldots, c_a\}$ may be included for those other factors. These coefficients and residual value may allow a share $s_n$ to be generated according to the following equation (in the manner that has already been discussed):

$$s_n = c_1 \cdot b_1 + \ldots + c_m \cdot b_m + c_{m+1} \cdot f_1 + \ldots + c_{m+a} \cdot f_a + r$$

By making the authentication data available to the computing device 100, the computing device can recreate the shares $S_n$, by combining the provided coefficients $C_m$ (and/or $C_a$) for each share $s_n$ with measured values of the behavioral biometrics $B_m$ (and/or copies of the other factors Fa provided by the user).

Accordingly, where the method 300 is performed by an authentication server 206, the authentication server 206 provides the authentication data to the computing device 100. In some embodiments the authentication data may be provided at a later point in time, such as in response to an authentication request. In other embodiments, the authentication data may be provided as part of the enrolment process to be stored by the device until it is needed for a later authentication attempt.

When the method 300 is performed by the computing device 100 itself, the authentication data is stored by the device in its memory 102. Since the authentication data merely contains indications of how to generate the shares based from measurements of the behavioral biometrics $B_m$ (and possibly other factors $F_a$), which will only be present on the device when the authorized user is using the device, the authentication data need not be considered to be sensitive data. However, the secret credential S used to generate the shares Sn is sensitive and so, in cases where the secret credential has been temporarily stored on the computing device 100 as part of the method 300, it is securely erased once the shares have been generated as it is no longer needed by the device 100 (since it can be recreated whenever it is needed based on authentication data and measurements of the behavioral biometrics of the user, provided the user is the authorized user).

As discussed above, the secret credential that is generated by the present invention may be used to encrypt sensitive data that is stored on the computing device. Accordingly, the method 300 may additionally comprise deriving a cryptographic key from the secret credential and using it to encrypt an item of data (these optional operations are not shown in FIG. 3). Since the cryptographic key is derived from the secret credential, which in turn can be recreated from a user's behavioral biometrics based on the authentication data, there is no need for the cryptographic key itself to be provided to or stored by the computing device 100 as it can be recreated by the computing device 100 from measurements of a user's behavioral biometrics when needed (provided that user is an authorized user).

Where the method 300 is performed remotely from the computing device 100 by an authentication server 206, the authentication server 206 may then provide the encrypted item of data to the computing device 100. In some embodiments, the encrypted item of data may be provided at the same time that the authentication data is provided to the computing device 100. In other embodiments, the encrypted item of data may be provided separately from (either before or after) the authentication data.

Where the method 300 is performed locally by the computing device 100 itself, the computing device may store the encrypted item of data in a memory 102 of the computing device 100.

As will be readily understood by those skilled in the art, the secret credential could itself be used as the cryptographic key to encrypt the data. Alternatively, various key derivation algorithms are known which deterministically generate a cryptographic key based on a particular input. Any suitable key derivation algorithm may be used to generate a cryptographic key based on the secret credential that is provided by the present invention. Similarly, any suitable encryption algorithm may be used to protect the data in the memory, as will be known to the skilled person. As examples, any one or more of the following symmetric and/or asymmetric encryption algorithms may be used: AES/Rijndael; Blowfish; DES; IDEA; RC2; RC4; RC6; Serpent; Triple DES; Twofish; RSA; Diffie-Hellman; DSA; ECDSA. Additionally, it will be further understood that the same concept can be applied to protect data that is transmitted by the computing system 100 to other computing systems (which may then obtain a cryptographic key for decrypting the data from the authentication server).

Figure 4:
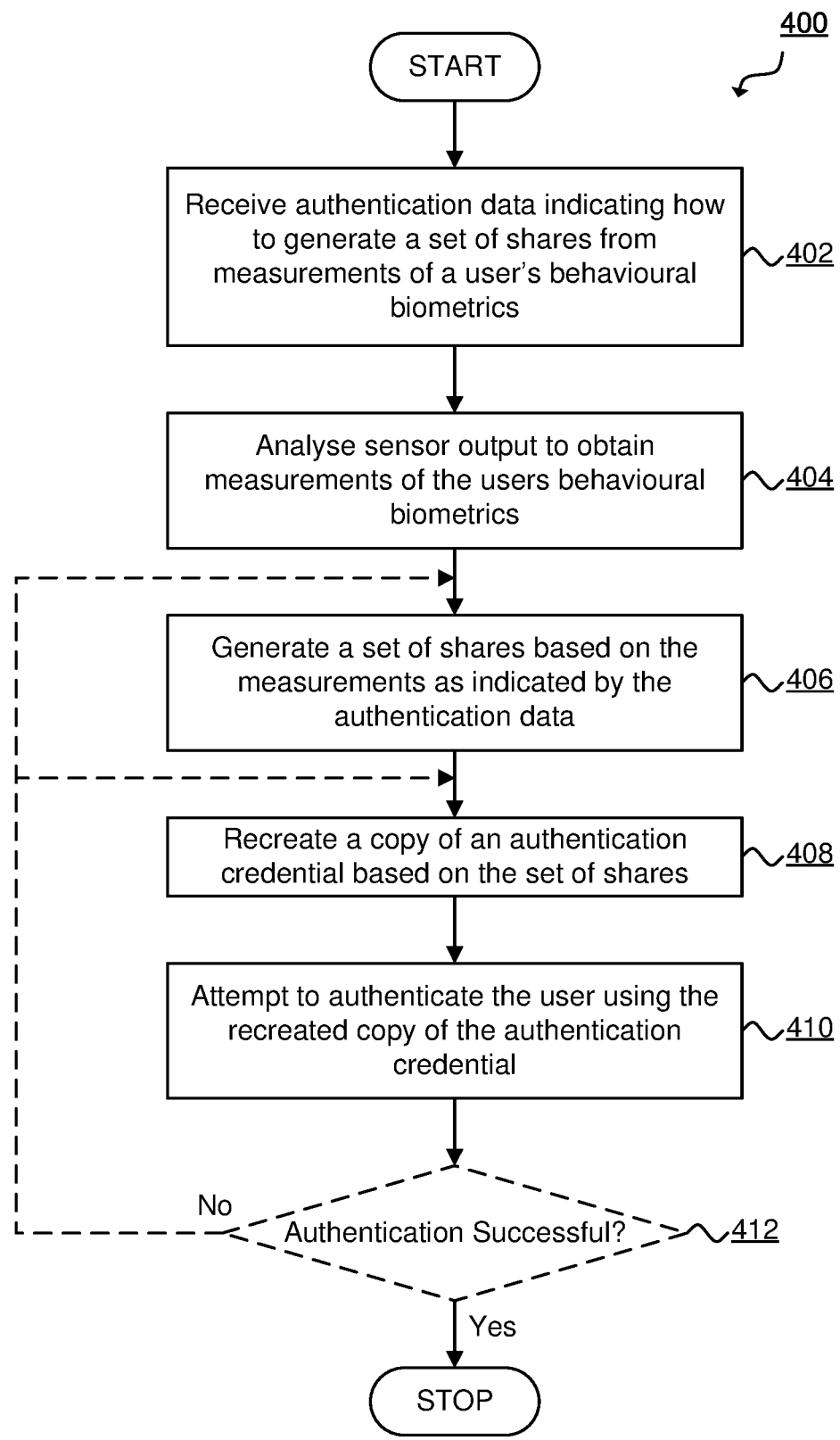
FIG. 4 is a flowchart that schematically illustrates a method for authenticating a user as an authenticated user of a computing device.

FIG. 4 is a flowchart that schematically illustrates a method 400 for authenticating a user 202 as an authenticated user of a computing device 100, such as mobile device 204a or 204b. This method 300 is performed locally by the computing device 100 itself.

At an operation 402, the method 400 receives authentication data indicating how to generate a set of shares from measurements of a user's behavioral biometrics. This authentication data is the authentication data that was generated when the user was enrolled as an authorized user of the computing device 100 (i.e. at operation 310 of method 300). In some embodiments, the authentication data may have been stored in a memory 102 of the device during the enrolment process, in which case it is retrieved as part of this operation 402. In other embodiments, the computing device 100 may request that the authentication data be provided by an authentication server 206, for example as part of a request to authenticate the user of the computing device 100. As discussed in detail above, the set of shares that are indicated by the authentication data represent a secret credential in accordance with a secret sharing scheme. The authentication data may also therefore include details of the secret sharing scheme used, as well is its parameters, such as the threshold t number of shares $S_n$ that are required for the secret credential S to be generated. However, the device 100 may already have knowledge of such details (e.g. where this is predetermined).

At an operation 404, the method 400 analyses the output from one or more sensors of the computing device 100 to determine a respective measurement for each of the behavioral biometrics for a current user of the computing device. That is to say, the computing device 100 determines those behavioral biometric measurements Bm that will be needed to recreate the secret credential S, as indicated by the authentication data received in operation 402. The computing device 100 then determines which sensors need to be monitored in order to derive those measurements Bm. The computing device 100 then determines measurements of the behavioral biometrics Bm from the output of those sensors.

As discussed above, determining these measurements Bm from the sensor data may include steps such as normalizing or classifying the data, or determining the measurements at a certain level of granularity, so as to ensure that repeatable measurements will be obtained when the authorized user is using the device 100. Such operations may be indicated in the authentication data or may already be known by the device 100 (such as by being predetermined).

In some embodiments, in order to prevent any delay in authenticating the user, measurements of the behavioral biometrics Bm are continuously (or regularly) determined, such that operation 404 comprises a background service which provides a current (or very recent) set of measurements for each of the behavioral biometrics Bm at any given time. This enables the current user of the device 100 to be authenticated at any given time without needing to wait for sufficient data to be gathered for the measurements Bm to be taken. In some embodiments, the output from the sensors may be continuously (or regularly) gathered and stored so that the measurements Bm can be determined from the recent measurements in response to an attempt to authenticate the user. Of course, in other embodiments, the data collection and analysis may be performed in response to an attempt to authenticate the user, although this will incur a delay before the authentication can be performed while a sufficient amount of data is gathered from which to reliably determine the behavioral biometric measurements Bm.

Having determined respective measurements for each of the behavioral biometrics Bm for a current user of the computing device at operation 404, the method 400 proceeds to an operation 406.

At an operation 406, the method 400 generates a set of shares $S_n$ in the manner indicated by the authentication data. For example, the authentication data may indicate, for each of the shares, a respective collection of coefficients $C_m$ and a respective residual value r. In some embodiments, the authentication data may indicate that some of the shares are to be generated based on other factors $F_a = \{f_1, \ldots, f_a\}$ (either in addition to behavioral biometrics or not), and additional coefficients $C_a = \{c_1, \ldots, c_a\}$ may be included for those other factors. These other factors may, for example, be knowledge based factors (such as a password) or physiological biometric factors (such as a measurement of a fingerprint). The computing device 400 may generate the set of shares from these coefficients $C_m$ and $C_a$ by evaluating the following equation using the measurements of the behavioral biometrics determined in operation 404:

$$s_n = c_1 \cdot b_1 + \ldots + c_m \cdot b_m + c_{m+1} \cdot f_1 + \ldots + c_{m+a} \cdot f_a + r$$

However, other techniques for indicating how to generate the shares may be used instead, in which case the shares $S_n$ are generated accordingly. Furthermore, as discussed above in relation to method 300, in some embodiments the threshold t for the secret sharing scheme that was used to generate the shares $S_n$ may be lower than the total number of shares in the set (i.e. t<n). In such embodiments, the computing device 100 does not necessarily need to recreate all of the shares $S_n$ indicated in the authentication data in order to recreate the secret credential S (and thereby successfully authenticate the user) and may be able to recreate the secret credential S from a set comprising just the threshold number t of shares.

Having generated a set of shares $S_n$ at operation 406, the method 400 proceeds to an operation 408.

At operation 408, the method 400 recreates a copy S' of the secret credential based on the set of shares $S_n$ that were generated in accordance with the secret sharing scheme. For example, when Shamir's secret sharing scheme is used, each of the shares $S_n$ represent a point on a polynomial of order t−1 (where t is the threshold of the secret sharing scheme). Lagrange basis polynomials can then be used to determine the coefficients of the polynomial of degree t−1 that is defined by those points. The secret credential S is then identified as the first coefficient of this polynomial.

Having recreated a copy S' of the secret credential at operation 408, the method 400 proceeds to an operation 410.

At operation 410, the method 400 authenticates the user in response to a determination that the recreated copy S' of the secret credential matches the original secret credential S. In other words, the recreated copy S' of the secret credential S is used with an authentication mechanism in which the user will only be successfully authenticated if the copy S' matches the actual secret credential S. It will be appreciated that no explicit step of determining whether the recreated copy S' matches the secret copy S need necessarily be carried out and that this may be implicit in the authentication mechanism. For example, the recreated copy S' of the secret credential may be hashed and the hashed version $S'^{\#}$ of the secret credential may be compared to a hashed version $S^{\#}$ of the original secret credential S. The user may then be considered to be successfully authenticated if the hashed versions of the secret credential match (i.e. if $S'^{\#} = S^{\#}$).

In some embodiments, the determination of whether the copy S' of the secret credential matches the original secret credential S is carried out by an authentication server 206. For example, an authentication message may be generated based on the copy of the secret credential and provided to the authentication server. It will be appreciated that the generation of the authentication message will depend on the particular authentication mechanism being used and that a wide range of authentication mechanisms may be used. In one example, the authentication message 206 may be generated in response to a challenge from the authentication server 206. The challenge can include a challenge value and the authentication message may be generated by encrypting the challenge value with the recreated copy of the secret credential S'. The authentication server 206 may then compare the encrypted version of the challenge value sent from the computing device with one separately generated by the authentication server 206 using the original secret credential S. If the two copies of the encrypted challenge value match, the authentication server 206 may consider the user to be successfully authenticated. In any case, regardless of the authentication mechanism used, the authentication server 206 sends back a response to the computing device indicating whether the user has been successfully authenticated.

In other embodiments, the determination of whether the copy S' of the secret credential matches the original secret credential S is carried out locally by the computing device 100 itself (in which case no authentication server 206 may be needed for such embodiments). For example, the device may store a hashed version $S^{\#}$ of the secret credential against which it can compare a hashed version $S'^{\#}$ of the recreated secret credential.

Having successfully authenticated the user at operation 410, the authentication method 400 ends and the computing device may allow access to any sensitive data stored thereon in accordance with the user's authenticated status. Optionally, if the authentication of the user at operation 410 fails, the method may decide to reiterate over some of the operations of the method 400 at an operation 412.

At optional operation 412, the method 400 determines whether to reiterate some of the operations of the method 400 if the attempt to authenticate the user at operation 410 was unsuccessful.

Failure of the authentication attempt implies that the recreated copy of the secret credential S' does not match the original secret credential S. One reason that this can occur, even when the authorized user is using the computing device 100, is that one or more of the measurements of the users behavioral biometrics upon which the generation of the set of shares was based does not match the typical measurements of those behavioral biometrics for that user. As already discussed, some behavioral biometrics may be useful in identifying a user when they are carrying out certain activities, but less useful in other situations (as they may take on different values). Where some of the measurements are incorrect (i.e. don't match the typical measurements for the user), any of the shares $S_n$ that were generated from such measurements will be incorrect leading to an incorrect copy of the secret credential S being generated. In some embodiments, the threshold t of the secret sharing scheme may be less than the total number of shares $S_n$ that are indicated in the authentication data (i.e. t<n). Accordingly, at operation 406, the computing device 100 may have recreated a subset of the set of shares which comprises fewer shares than were indicated by the authentication data (but which includes at least the threshold number t of shares). Therefore, in response to an unsuccessful authentication attempt, the method 400 may reiterate back to operation 406 and generate an additional share $s_n$. Then at operation 408, a different copy S" of the secret credential may be created based on a different combination of the shares that have been generated and authentication may be reattempted using this different copy S" of the secret credential. This may be performed iteratively until a successful authentication is achieved, or until no more unique combinations of shares remain from which different copies of the secret credential can be obtained in which case the authentication is considered to have been unsuccessful. Of course, in some embodiments, only a certain number of iterations may be performed before determining that the authentication is unsuccessful. Furthermore, it is noted that where a different combination of the generated shares remains untried, the method 400 may re-iterate to operation 408 instead of 406 to test different copies of the secret credential generated from different combinations of the shares that have already been generated before generating additional shares. Therefore, due to the redundancy provided by the threshold of the secret sharing schemes, multiple authentication attempts may be made based on different behavioral biometrics, which may provide some resilience against situations in which measurements of some of the behavioral biometrics may be unreliable. The greater the difference between the total number of shares n and the threshold t of the secret sharing scheme, the more resilient the method 400 may be to such situations.

As discussed above, the secret credential that is generated by the present invention may be used to cryptographically protect sensitive data that is stored on the computing device 100. Accordingly, in the same manner as discussed in relation to the previous method 300, this method 400 may additionally comprise deriving a cryptographic key from the secret credential (not shown in FIG. 4). Again, any suitable key derivation algorithm may be used to generate a cryptographic key, or indeed, the secret credential itself may serve as the cryptographic key. In some embodiments, the computing device 100 uses the cryptographic key to decrypt data that has already been stored on (or provided to) the device 100. For example, during enrolment, the authentication server 206 may provide an encrypted item of data for storage on the computing device 100. In some embodiments, the computing device 100 additionally or alternatively uses the cryptographic key to encrypt an item of data for storage in the memory 102 of the computing device 100 for future use. Again, any suitable encryption algorithm may be used.

In some embodiments, secure computing techniques may be used to help protect sensitive elements of the methods 300 and 400 from being exposed. For example, isolated process computation and memory enclaves may be used to protect sensitive elements of the method 300 and 400 from being exposed to (and potentially compromised by) other processes running on the computing device 100 and/or the authentication server 206. In particular, the secret credential S and, where applicable, any derived cryptographic key may be considered to be sensitive elements. Secure computing techniques may be used to generate these elements in order to carry out any authentication and/or cryptographic operations.

Furthermore, since the computing device 100 can readily recreate these elements whenever the authorized user is using the device (base on the measurements of their behavioral biometrics) these elements may be deleted after each operation that they are required for and recreated as necessary for any subsequent operations without causing any inconvenience to the user. Irrespective of whether secure computing techniques are used, this can help to minimize the risk of those elements being compromised.

In some embodiments of the invention, multi-party computation is used to determine the secret credential S that is to be used to authenticate the user. This enables the user to be enrolled as an authorized user of the computing device 100 by computations that are performed by both the authentication server 206 and the computing device 100 in such a way that the authentication server 206 generates (or otherwise determines) the credential and the mobile device measures/chooses the behavioral biometrics without requiring a trusted arrangement between the computing device 100 and the authentication server 206. That is to say, the mobile device 100 need not learn the credential during enrolment (although it can of course be recreated later on from the generated shares) and the server 206 doesn't need to have any knowledge of the user's behavioral biometric measurements. This means that the authentication server is able to enroll and authenticate the user and both the mobile device and the server can save the necessary configuration data (e.g. authentication data) to be able to respectively re-compute the secret credential S in order to carry out the authentication.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure. The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

In summary, computer implemented methods for enrolling a user as an authenticated user of a computing device and for authenticating a user of a computing device are provided. The methods make use of behavioral biometrics to determine a set of shares that represent a secret credential according to a secret sharing scheme. The set of shares is initially determined when the user is enrolled based on typical measurements of the user's behavioral biometrics and authentication data indicating how to generate the set of shares from a user's behavioral biometrics is generated. When authenticating the user, the computing device can generate the set of shares based on the authentication data and measurements of the current user's behavioral biometrics. The computing device can use the generated set of shares to recreate a copy of the secret credential with which to authenticate the user.

The invention claimed is:

1. A computer implemented method for enrolling a user as an authenticated user of a computing device, the method comprising:
    identifying one or more behavioral biometrics upon which authentication of a user is to be based;
    determining, for each of the behavioral biometrics, a typical measurement of the respective behavioral biometric for the user;
    determining a secret credential to be used to authenticate the user;
    generating a set of shares representing the secret credential in accordance with a secret sharing scheme, the set of shares comprising one or more shares that are generated based, at least in part, on the typical measurement of a respective one or more of the behavioral biometrics, wherein generating the one or more shares comprises generating a respective set of coefficients for each of the one or more shares and a residual value for the one or more shares, wherein each set of coefficients comprises a respective coefficient for each of the one or more behavioral biometrics; and
    generating authentication data for the computing device, the authentication data indicating how to generate the set of shares based on the set of coefficients, the residual value, and the measurements of the one or more behavioral biometrics.

2. The method of claim 1 wherein:
    the set of shares are each generated based, at least in part, on the typical measurement of a respective one or more of the behavioral biometrics; and
    the authentication data indicates how to generate each of the set of shares based on the measurement of the respective one or more of the behavioral biometrics.

3. The method of claim 1, wherein at least one of the shares in the set of shares is generated based on the typical measurements of a respective plurality of the behavioral biometrics.

4. The method of claim 1, wherein the secret sharing scheme enables recreation of the secret credential from any subset of the set of shares that comprises at least a predetermined number of shares.

5. The method of claim 4, wherein the one or more shares that are generated based on the typical measurements of the one or more behavioral biometrics comprise more than the predetermined number of shares.

6. The method of claim 1, wherein the method is performed by an authentication server and further comprises:
    providing the authentication data to the computing device.

7. The method of claim 1, wherein the method is performed by the computing device and further comprises:
    receiving the secret credential from an authentication server;
    storing the authentication data in a memory of the computing device; and
    erasing the secret credential from the computing device.

8. A computer implemented method for authenticating a user of a computing device, the method comprising:
    receiving authentication data indicating how a set of shares representing a secret credential in accordance with a secret sharing scheme can be generated including how to generate one or more shares of the set of shares based, at least in part, on measurements of one or more behavioral biometrics of a user, wherein the authentication data comprises a respective set of coefficients for each of the one or more shares and a residual value for the one or more shares, wherein each set of coefficients comprises a respective coefficient for each of the one or more behavioral biometrics;
    analyzing an output from one or more sensors of the computing device to determine a respective measurement for each of the behavioral biometrics for a current user of the computing device;
    generating a set of shares as indicated by the authentication data, including generating the one or more shares based on the respective set of coefficients, the residual value, and the respective measurements of the behavioral biometrics;
    recreating a copy of the secret credential based on the generated set of shares in accordance with the secret sharing scheme; and
    authenticating the user in response to a determination that the recreated copy of the secret credential matches the secret credential.

9. The method of claim 8, wherein:
    the secret sharing scheme enables the recreation of the secret credential from any subset of the set of shares that comprises at least a predetermined number of shares; and
    generating a set of shares comprises generating a subset of the set of shares indicated by the authentication data, the subset comprising at least the predetermined number of shares, wherein one or more of the shares is generated based on the respective measurements of the behavioral biometrics.

10. The method of claim 9, wherein:
    the subset of the set of shares comprises more than the predetermined number of shares;
    recreating a copy of the secret credential comprises recreating a plurality of copies of the secret credential, each of the plurality of copies being generated based on a different combination of at least the predetermined number of shares; and
    the user is authenticated in response to a determination that any of the recreated copies of the secret credential matches the secret credential.

11. The method of claim 8, wherein the authentication data indicates how to generate each of the set of the shares based, at least in part, on measurements of a respective one or more of the behavioral biometrics.

12. The method of claim 8, wherein the authentication indicates how to generate at least one of the shares in the set of shares based, at least in part, on the measurements of a respective plurality of the behavioral biometrics.

13. The method of claim 8, wherein authenticating the user comprises:

generating an authentication message based on the copy of the secret credential;

providing the authentication message to an authentication server; and receiving a response to the authentication message from the authentication server, the response indicating that the user is authenticated when the copy of the secret credential matches the secret credential.

14. The method of claim 8, wherein the method further comprises:

deriving a cryptographic key from the secret credential; and decrypting or encrypting an item of data using the cryptographic key.

15. A computer system comprising:

a processor and a memory storing computer program code for enrolling a user as an authenticated user of a computing device by:

identifying one or more behavioral biometrics upon which authentication of a user is to be based;

determining, for each of the behavioral biometrics, a typical measurement of the respective behavioral biometric for the user;

determining a secret credential to be used to authenticate the user;

generating a set of shares representing the secret credential in accordance with a secret sharing scheme, the set of shares comprising one or more shares that are generated based, at least in part, on the typical measurement of a respective one or more of the behavioral biometrics, wherein generating the one or more shares comprises generating a respective set of coefficients for each of the one or more shares and a residual value for the one or more shares, wherein each set of coefficients comprises a respective coefficient for each of the one or more behavioral biometrics; and generating authentication data for the computing device, the authentication data indicating how to generate the set of shares based on the set of coefficients, the residual value, and the measurements of the one or more behavioral biometrics.

16. A non-transitory computer-readable storage medium storing a computer program which, when executed by one or more processors, is arranged to enroll a user as an authenticated user of a computing device by:

identifying one or more behavioral biometrics upon which authentication of a user is to be based;

determining, for each of the behavioral biometrics, a typical measurement of the respective behavioral biometric for the user;

determining a secret credential to be used to authenticate the user;

generating a set of shares representing the secret credential in accordance with a secret sharing scheme, the set of shares comprising one or more shares that are generated based, at least in part, on the typical measurement of a respective one or more of the behavioral biometrics, wherein generating the one or more shares comprises generating a respective set of coefficients for each of the one or more shares and a residual value for the one or more shares, wherein each set of coefficients comprises a respective coefficient for each of the one or more behavioral biometrics; and generating authentication data for the computing device, the authentication data indicating how to generate the set of shares based on the set of coefficients, the residual value, and the measurements of the one or more behavioral biometrics.

\* \* \* \* \*